(12) United States Patent
Huebner

(10) Patent No.: US 12,061,570 B2
(45) Date of Patent: Aug. 13, 2024

(54) THREE-DIMENSIONAL MODEL CONFIGURATOR METHOD

(71) Applicant: Dollypup Productions, LLC, Bowie, MD (US)

(72) Inventor: Christopher Allen Huebner, Bowie, MD (US)

(73) Assignee: Dollypup Productions, LLC, Bowie, MD (US)

( * ) Notice: Subject to any disclaimer, the term of this patent is extended or adjusted under 35 U.S.C. 154(b) by 0 days.

(21) Appl. No.: 17/666,965

(22) Filed: Feb. 8, 2022

(65) Prior Publication Data

US 2022/0253403 A1    Aug. 11, 2022

Related U.S. Application Data

(60) Provisional application No. 63/147,010, filed on Feb. 8, 2021.

(51) Int. Cl.
    *G06F 16/11* (2019.01)
(52) U.S. Cl.
    CPC .................................. *G06F 16/116* (2019.01)
(58) Field of Classification Search
    CPC .................................................. G06F 16/116
    USPC ......................................................... 707/809
    See application file for complete search history.

(56) References Cited

U.S. PATENT DOCUMENTS

| | | | |
|---|---|---|---|
| 6,922,701 B1 | 7/2005 | Ananian | |
| 8,255,338 B1 | 8/2012 | Brittan | |
| 9,367,950 B1 * | 6/2016 | Scranton | ................. G06F 3/011 |
| 10,198,863 B2 | 2/2019 | Ullom | |
| 11,507,711 B2 | 11/2022 | Huebner | |
| 2003/0033163 A1 | 2/2003 | Habiby | |
| 2006/0101742 A1 | 5/2006 | Scott-Leikach | |
| 2007/0179758 A1 | 8/2007 | Neumann | |
| 2008/0180460 A1 | 7/2008 | Ford | |
| 2009/0160856 A1 | 6/2009 | Hoguet | |

(Continued)

FOREIGN PATENT DOCUMENTS

| | | |
|---|---|---|
| CN | 101719175 A | 6/2010 |
| JP | 2004139241 A | 5/2004 |

(Continued)

OTHER PUBLICATIONS

Commercial Kitchen Guide; Minnesota Institute for Sustainable Agriculture (MISA); http://misadocuments.info/Commercial_Kitchen_Guide.pdf; known at least as early as Dec. 14, 2020, 32 pages.

(Continued)

*Primary Examiner* — Hosain T Alam
*Assistant Examiner* — Saba Ahmed
(74) *Attorney, Agent, or Firm* — FITCH EVEN TABIN & FLANNERY, LLP

(57) ABSTRACT

A control circuit accesses a memory having stored therein data for a three-dimensional model in a first file format (such as, for example, an OBJ file format). The control circuit correlates components of the three-dimensional model in the first file format to corresponding codes, and then expresses the three-dimensional model as data for the three-dimensional model in a second file format (such as, for example, an RVT file format) that is different from the first file format as a function of the aforementioned corresponding codes.

9 Claims, 8 Drawing Sheets

(56) References Cited

U.S. PATENT DOCUMENTS

| | | | |
|---|---|---|---|
| 2010/0148641 | A1 | 6/2010 | Ehmke |
| 2010/0198563 | A1 | 8/2010 | Plewe |
| 2011/0307281 | A1 | 12/2011 | Creveling |
| 2015/0161695 | A1 | 6/2015 | Koby |
| 2015/0169791 | A1 | 6/2015 | Lavrov |
| 2015/0324940 | A1 | 11/2015 | Samson |
| 2016/0034137 | A1 | 2/2016 | Foster |
| 2016/0185907 | A1 | 6/2016 | Gupta |
| 2016/0189071 | A1 | 6/2016 | Scholar |
| 2017/0132568 | A1* | 5/2017 | Glunz ............... H04L 67/10 |
| 2017/0358126 | A1* | 12/2017 | Lim ............... G06T 3/0018 |
| 2018/0089336 | A1 | 3/2018 | Ninomiya |
| 2018/0225408 | A1 | 8/2018 | Ziolo |
| 2018/0285517 | A1 | 10/2018 | Reichental |
| 2019/0026407 | A1* | 1/2019 | Barnes ............... G06Q 30/0621 |
| 2019/0051054 | A1 | 2/2019 | Jovanovic |
| 2019/0205310 | A1 | 7/2019 | Satkunarajah |
| 2019/0354640 | A1 | 11/2019 | Huebner |
| 2019/0354652 | A1 | 11/2019 | Huebner |
| 2021/0073441 | A1* | 3/2021 | Austern ............... G06F 30/20 |
| 2021/0224361 | A1* | 7/2021 | Veldsman ............... B33Y 50/02 |
| 2023/0049149 | A1 | 2/2023 | Huebner |

FOREIGN PATENT DOCUMENTS

| | | | |
|---|---|---|---|
| WO | 2015095141 | A1 | 6/2015 |
| WO | 2017061954 | A1 | 4/2017 |

OTHER PUBLICATIONS

Dassault Systemes. "Introducing SolidWorks." 2015. Wayback machine Jul. 12, 2017. Accessed on May 7, 2022 at https://web.archive.org/web/20170712123739/https://my.solidworks.com/solidworks/guide/SOLI DWORKS_Introduction_EN .pdf. PP. 1-127. (Year: 2015).

European Patent Application No. 19804406.7; Communication Pursuant to Article 94(3) EPC Dated Jan. 21, 2022; 25 Pages.

European Patent Application No. 19804406.7; Communication under R.61 or R 63 Dated Dec. 22, 2021; 6 Pages.

European Patent Application No. 19804406.7; Partial Supplementary European Search Report and Opinion Dated Jul. 16, 2021; 20 Pages.

Food Establishment Plan Review Manual; http://www.foodprotect.org/media/guide/2016-plan-review-manual.pdf; 2016 version; 45 pages.

Go! Foodservice Restaurant Equipment and Supplies; Commercial vs. Residential Range Buying Guide; https://www.gofoodservice.com/guides/commercial-vs-residential-ranges-guide Believed to be known at least as early as Jan. 17, 2020, Foodservice; 8 pages.

IBISWorld; Commercial Cooking Equipment Manufacturing Industry in the US; https://www.ibisworld.com/united-states/market-research-reports/commercial-cooking-equipment-manufacturing-industry/; Sep. 29, 2020; 11 pages.

International Search Report and Written Opinion; PCT/US20/38931; 14 Pages; Dated Aug. 28, 2020.

North American Association of Food Equipment Manufacturers (NAFEM); NAFEM Overview; https://www.nafem.org/ wp-content/uploads/2020/07/NAFEM-Fact-Sheet_2020-1.pdf, Known at least as early as Jul. 2020, 2 pages.

NSF; Food Equipment Certification; https://www.nsf.org/testing/food/product-certification/food-equipment/food-equipment-certification; Known at least as early as Dec. 14, 2020, NSF International; 3 pages.

NSF; Food Equipment Standards; https://www.nsf.org/standards-development/standards-portfolio/food-equipment-standards; Known at least as early as Dec. 14, 2020, NSF International; 6 pages.

PCT Patent Application No. PCT/US19/32409; International Search Report and Written Opinion dated Jul. 25, 2019, 9 pages.

Nefedova, Anna, et al. "Selection of individual automatic heat supply unit of ecomatic LLC." Procedia engineering 117 (2015). pp. 1097-1106. (Year: 2015).

Price My Kitchen; 3 Major Differences in a Commercial and a Residential Kitchen; https://www.pricemykitchen.com/3-major-differences-in-a-commercial-and-a-residential-kitchen/# :~: text=Commercial%20kitchens%20require%20freezers %2C%20huge,is%20no%20need%20for%20that .; Believed to be known at least as early as Sep. 2016, Commercial Kitchen Equipment Comparison, Deals, Chefs, Restaurants; 8 pages.

RestoHub; Building Codes, Accessibility, & Inspections; https://www.restohub.org/permits/building-codes-accessibility-inspections/ ; known at least as early as Dec. 14, 2020, 4 pages.

U.S. Public Health Servicer Food Code 2017; U.S. Food & Drug; Administrationhttps://www.fda.gov/media/110822/download; known at least as early as Dec. 31, 2017, 767 Pages.

UL; 30 Years of Foodservice Equipment Sanitation Services; https://www.ul.com/news/30-years-foodservice-equipment-sanitation-services; May 29, 2019; 4 pages.

* cited by examiner

The Increment Selected As A Result Of The User Selection Becomes The Insertion Point Of The Object To Be Placed The Size Of The Object To Be Placed Is Used To Determine The Size Of The Modular Section Required To Be Removed To Make Room For The Object To Be Placed

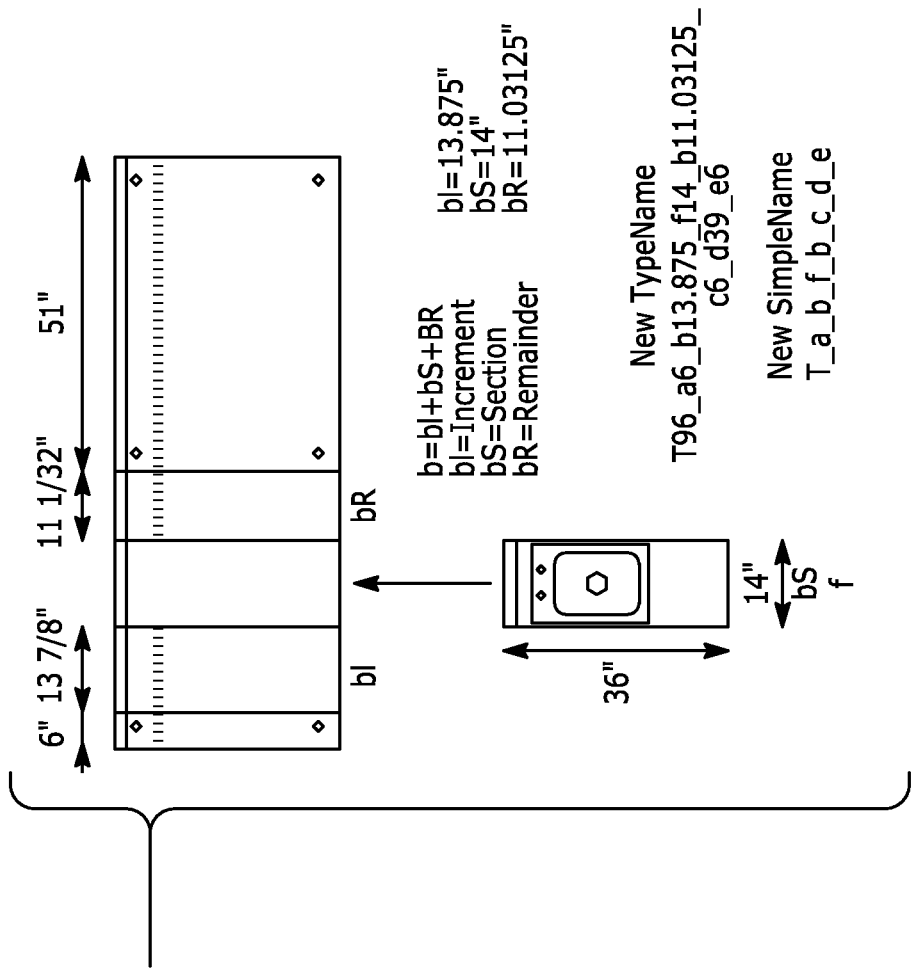

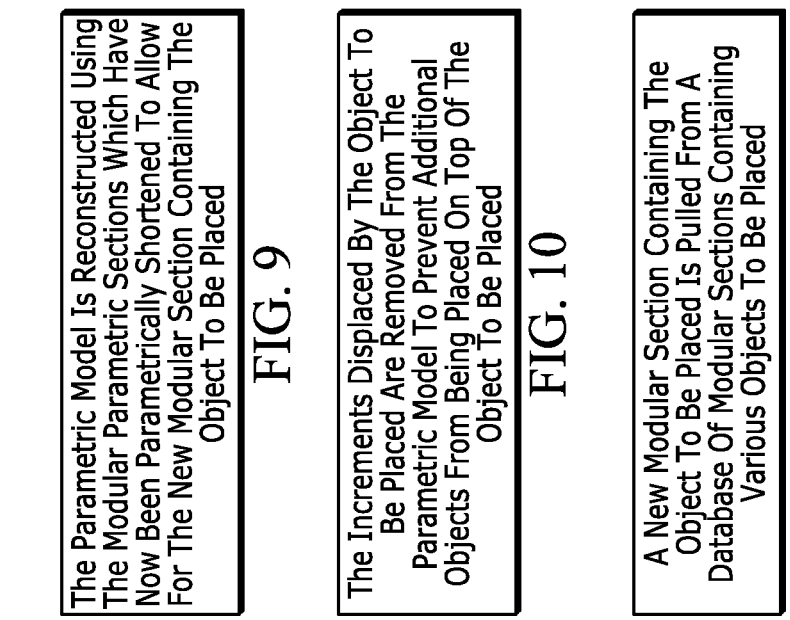

FIG. 9

The Parametric Model Is Reconstructed Using The Modular Parametric Sections Which Have Now Been Parametrically Shortened To Allow For The New Modular Section Containing The Object To Be Placed

FIG. 10

The Increments Displaced By The Object To Be Placed Are Removed From The Parametric Model To Prevent Additional Objects From Being Placed On Top Of The Object To Be Placed

FIG. 11

A New Modular Section Containing The Object To Be Placed Is Pulled From A Database Of Modular Sections Containing Various Objects To Be Placed

THREE-DIMENSIONAL MODEL CONFIGURATOR METHOD

RELATED APPLICATION(S)

This application claims the benefit of U.S. Provisional application No. 63/147,010, filed Feb. 8, 2021, which is incorporated by reference in its entirety herein.

TECHNICAL FIELD

These teachings relate generally to file formats and more particularly to three-dimensional model configuration.

BACKGROUND

Three-dimensional models are known in the art. Generally speaking, three-dimensional modeling typically comprises developing a mathematical coordinate-based representation of surfaces of an object in three dimensions using specialized configuration software by manipulating edges, vertices, and polygons in a simulated three-dimensional space. Model configuration software will support, for example, configuring three-dimensional models of such things as the components of a commercial kitchen (such as tables, appliances, faucets, and so forth), a healthcare facility, or a physical retail facility.

Some configuration systems may be more limited than others as regards configuring (or reconfiguring) a three-dimensional model in a desired way. Certain results may not be attainable at all, the process may be unduly challenging and non-intuitive, or the end result may not be sufficiently usable (where, for example, the end result model is itself represented as a plurality of models in combination with one another rather than as a single, unified model). Such a system may nevertheless have other desirable features, however, thereby presenting users with a conundrum; whether to accept the configuration limitations of such a system in order to attain the benefits of the other supported features.

Such three-dimensional models are typically stored using a corresponding file format. A given file format specifies how bits are used to encode information in a digital storage medium. Some file formats are designed for very particular types of data, and in some cases a given file format may be proprietary and the workings of its complimentary software not fully understood by the public.

BRIEF DESCRIPTION OF THE DRAWINGS

The above needs are at least partially met through provision of the code-based file format conversion described in the following detailed description, particularly when studied in conjunction with the drawings, wherein:

FIG. 9 comprises a process-step diagram as configured in accordance with various embodiments of these teachings;

FIG. 10 comprises a process-step diagram as configured in accordance with various embodiments of these teachings;

FIG. 11 comprises a process-step diagram as configured in accordance with various embodiments of these teachings;

Figure 1:
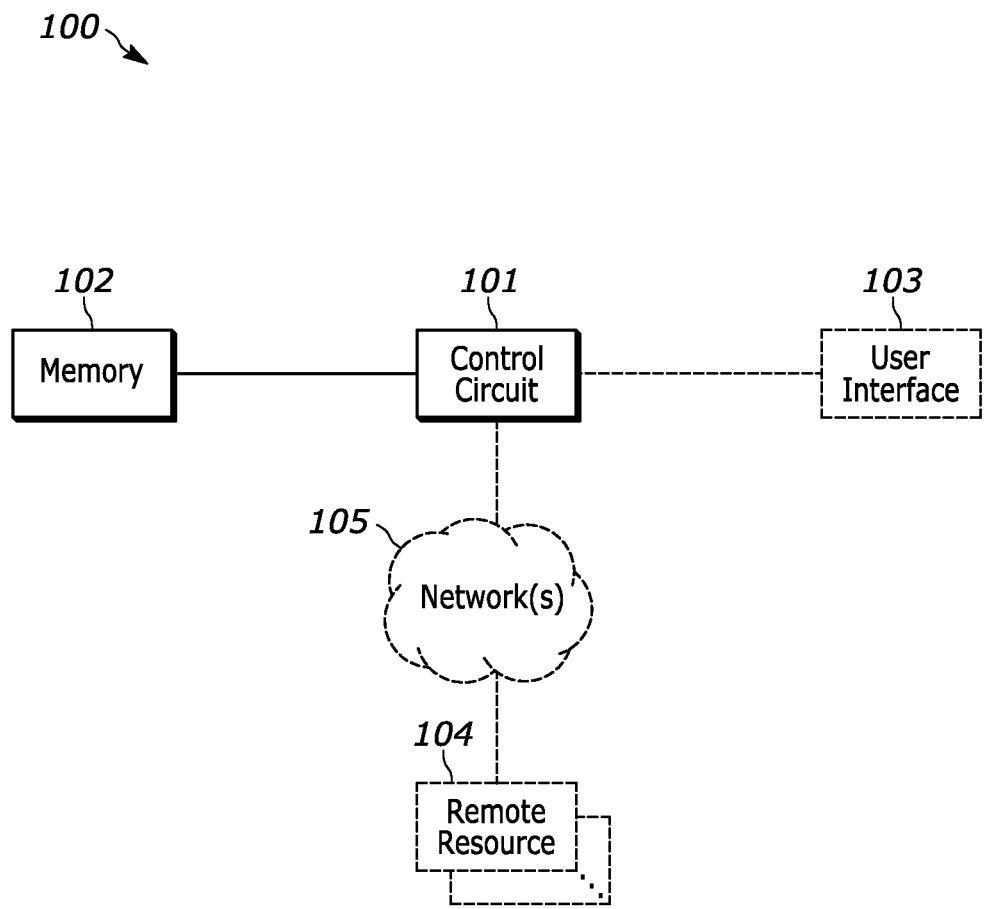
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments, a control circuit accesses a memory having stored therein data for a three-dimensional model in a first file format (such as, for example, an OBJ file format). The control circuit correlates components of the three-dimensional model in the first file format to corresponding codes, and then expresses the three-dimensional model as data for the three-dimensional model in a second file format (such as, for example, an RVT file format) that is different from the first file format as a function of the aforementioned corresponding codes.

Those corresponding codes, by one approach, can each comprise a string that identifies a particular predefined shape in the second file format and corresponding parameters for that particular predefined shape. Examples of such parameters include, but are not limited to, variable values representing corresponding physical dimensions that in turn correspond to the particular predetermined shape. For example, at least a plurality of the corresponding parameters can comprise variable values representing corresponding physical dimensions that correspond to the particular predetermined shape.

These teachings are practical and flexible in practice and will accommodate, for example, use in conjunction with a three-dimensional model configurator. In such a case, and by way of illustration, the aforementioned control circuit can provide to a user a three-dimensional model creation opportunity via a user interface. So configured, via that three-dimensional model creation opportunity, the user can input content that defines the three-dimensional model, following which the control circuit can store that three-dimensional model in the aforementioned memory in the aforementioned first file format.

So configured, such a configurator can define a desired three-dimensional model notwithstanding incompatibility between that configurator and another configurator to which the user wishes to export that three-dimensional model and notwithstanding that the user lacks sufficient information to resolve that incompatibility using ordinary prior art technique. Accordingly, these teachings can free the user to employ a configurator that better suits their present needs without abandoning another configurator that supports their usual or other needs.

These and other benefits may become clearer upon making a thorough review and study of the following detailed description. Referring now to the drawings, and in particular to FIG. 1, an illustrative apparatus 100 that is compatible with many of these teachings will first be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

In this example, the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101). It will also be understood that this memory 102 may comprise a plurality of physically discrete memories that, in the aggregate, store the pertinent information that corresponds to these teachings.

In addition to the three-dimensional model information, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach, the control circuit 101 operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

If desired, the control circuit 101 can also operably couples via one or more networks 105 to any of a variety of remote resources 104. These remote resources 104 may provide access, for example, to three-dimensional model information, specifications and tolerances, and so forth as appropriate to the application setting.

Figure 2:
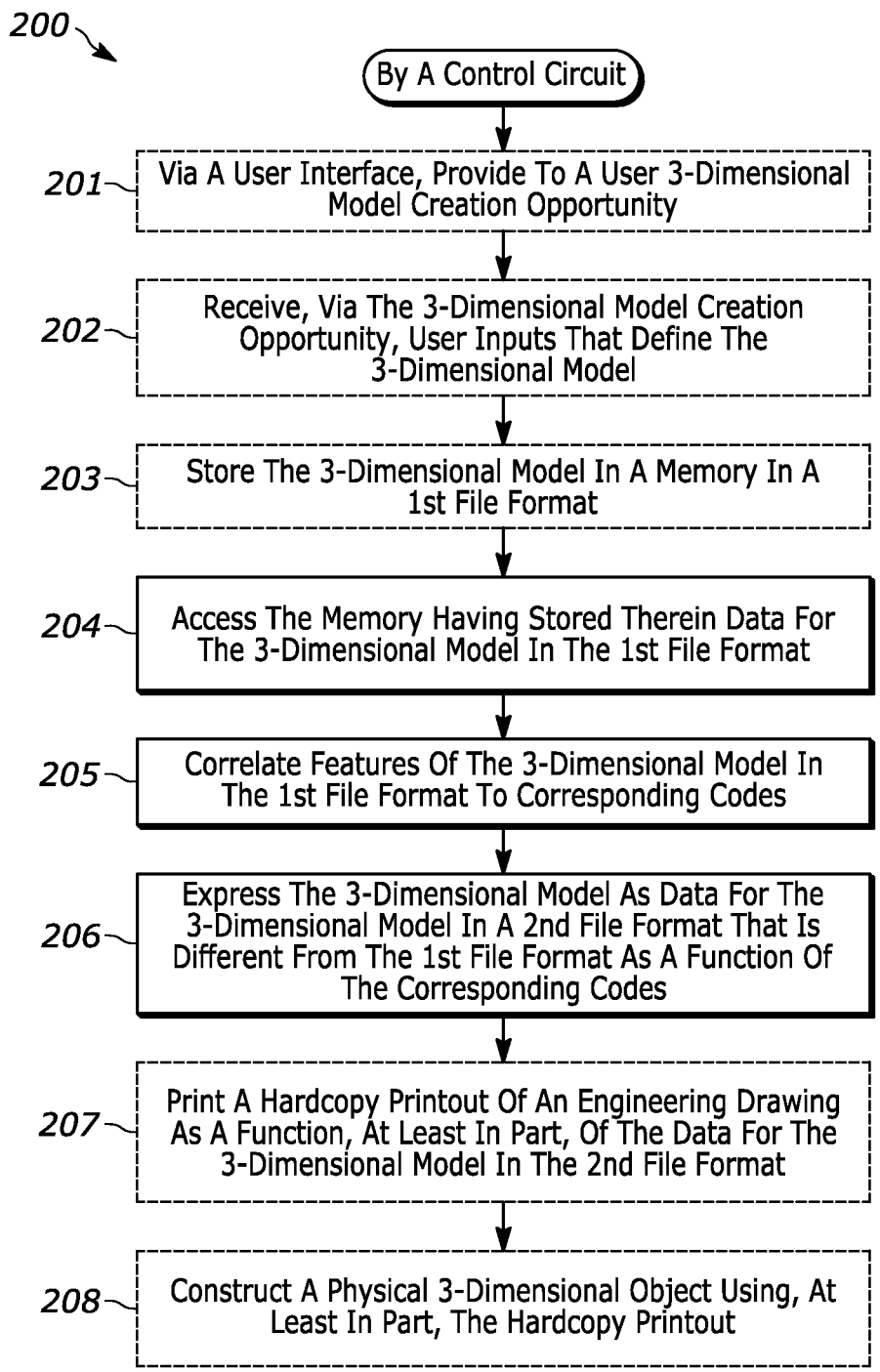
FIG. 2 comprises a flow diagram as configured in accordance with various embodiments of these teachings.

Referring now to FIG. 2, a process 200 that can be carried out by the aforementioned control circuit 101 will be described. It shall be understood that the details in this example are provided for the sake of illustration and should not be construed as suggesting any particular limitations with respect to these teachings.

By one optional approach these teachings are employed in the context of configuring a three-dimensional model. The first three blocks (201-203) of this process 200 correspond to such activity.

At block 201, and via the aforementioned user interface 103, the control circuit 101 provides to a user a three-dimensional model creation opportunity. By one approach this includes permitting the user to select one or more pre-configured models (that may correspond to a complete item such as an appliance, table or the like, or that may correspond to only a component of such a thing, such as a curved surface, a leg, and secondary worksurface, etc.) and to selectively modify and/or combine such components in any of a variety of ways. At block 202, via that three-dimensional model creation opportunity, the control circuit 101 receives user inputs that define the desired three-dimensional model. That model may comprise, for example, a model for a component of at least one of a commercial kitchen, a healthcare facility, and a physical retail facility, amongst other possibilities. (Those skilled in the art know that a "commercial" kitchen differs from a residential kitchen in any of a variety of ways, but certainly because a commercial kitchen must comply with a variety of laws, regulations, and/or standards that do not apply to a residential kitchen.) For the sake of an illustrative example, it will be presumed that the model comprises a model for a component of a commercial kitchen.

At block 203, that three-dimensional model is stored in the memory 102 in a first file format. For the sake of an illustrative example, this first file format is presumed to comprise an OBJ file format. OBJ file format is an open (i.e., nonproprietary) geometry definition file format. More particularly, OBJ comprises a simple data-format that represents three-dimensional geometry alone; in particular, the position of each vertex, the UV position of each texture coordinate vertex, vertex normals, and the faces that make each polygon defined as a list of vertices, and texture vertices. Vertices are typically stored in a counter-clockwise order by default, making explicit declaration of face normals unnecessary. OBJ coordinates have no units, but OBJ files can contain scale information in a human readable comment line.

Via the foregoing activity, the user can create a particular three-dimensional model per their needs and requirements. For the sake of an illustrative example, this model may comprise a model for a table surface for a commercial kitchen. In this example, however, the user wishes/needs to make use of that model in a different program. For the sake of an illustrative example, it will be presumed here that this other program is Autodesk Revit as is well known in the art.

Autodesk Revit is a building information modelling software for architects, landscape architects, structural engineers, mechanical, electrical, and plumbing engineers, designers and contractors. Autodesk Revit allows users to design a part or all of a building and its components in three dimensions. Autodesk Revit employs the proprietary file format RVT. It may be helpful to understand that a three-dimensional model created within Autodesk Revit is a so-called native Revit model. A native Revit model can be manipulated/processed using the full panoply of Revit modeling capabilities (for example, the object can be easily re-sized, re-textured, and so forth). While some three-dimensional images can be imported into Autodesk Revit, those images cannot be manipulated in a manner akin to a native Revit model.

The OBJ and RVT file formats are not inherently interchangeable, nor does the prior art provide for a convenient and specific way to convert an OBJ file to an RVT file. Accordingly, a three-dimensional model in an OBJ file format is largely nonusable in a system based on use of RVT file formats.

With the foregoing in mind, and referring now to block 204 of this process 200, the control circuit 101 accesses the memory 102 having the aforementioned data for the three-dimensional model in the first file format and then, at block 205, correlates the components of the three-dimensional model in the first file format to corresponding codes. As used herein, this reference to "code" and "codes" will be understood to not refer to operational software code. Instead, these codes are, in the present example, alphanumeric expressions that correlate features of the three-dimensional model in the first format to elements from a library of pre-created elements that are native to components expressed via a second file format (such as the RVT file format).

By one approach, these codes can comprise, if desired, a string (such as an alphanumeric string) that identifies a particular predefined shape in the second file format. Revit files contain a set of building data and a set of geometry data. More particularly, and unlike much of the prior art, the foregoing information leverages polygon shapes rather than triangle shapes. By using polygons, the Revit information can be easily and quickly be scaled in size to allow the user to quickly, for example, zoom in and out of a particular view. The first file format in this example, however, relies upon the more traditional use of triangle shapes, which are not readily converted to the polygon shapes employed by Revit. The aforementioned codes serve to identify specific pre-created polygons from a corresponding library of such shapes that correlate to specific features of the three-dimensional model stored in the non-RVT format.

In addition to the foregoing, these codes can further comprise, if desired, a string (such as an alphanumeric string) that identifies corresponding parameters (such as but not limited to physical dimensions) that correspond to a particular predetermined shape. By one approach, at least a plurality of such parameters can comprise variable values that represent corresponding physical dimensions that correspond to a particular predetermined shape.

At block 206, then, the control circuit 101 expresses the three-dimensional model as data for the three-dimensional model in a second file format (in this example, the RVT file format) as a function of those corresponding codes. In particular, by identifying and accessing the pre-created polygons, the latter can be aggregated to construct/define the three-dimensional model in the RVT file format without requiring a more traditional conversion process that is technically otherwise undoable due to a lack of information regarding the complete Revit operating domain.

As is described in detail below, these teachings will accommodate use of "types" to name and simultaneously encode a given component. By one approach, the foregoing three-dimensional model in the RVT file format can include or simply essentially consist of a master type that identifies each utilized pre-created polygon (with or without its corresponding physical parameter(s)) and that also excludes inclusion of any non-used but available pre-created polygons. Using this approach can dramatically reduce the size of the attendant Revit file, yielding a file, for example, of only a few kbytes of data instead of many megabytes of data that would otherwise be required. That reduction in data can, in turn, reduce memory and bandwidth requirements and result in a more time and computationally-efficient process.

Those skilled in the art will also appreciate that the three-dimensional model in the RVT file format formed as described above can later be imported back external to the Autodesk Revit operating environment to essentially repeat the foregoing steps to thereby modify the model, following which the modified model can again be expressed in the second file format and again utilized in, for example, the Autodesk Revit operating environment. As a simple illustrative example in these regards, the user may create a three-dimensional model of a commercial kitchen table having a cutting board and then transfer that model over to Autodesk Revit for use in a commercial kitchen design. Upon deciding to remove the cutting board, or to move the location of the cutting board, or to change the size of the cutting board, or to change the texture of the cutting board to represent a different material, the model information can be used as the starting point in the above-described process to permit such changes to be made using the first file format and to then again import the modified model back to Autodesk Revit.

The results of the foregoing process can be leveraged in any of a variety of ways. As one simple example, at optional block 207 the control circuit 101 can print (via the aforementioned user interface 103) a hardcopy printout of an engineering drawing as a function, at least in part, of the data for the three-dimensional model in the second file format. More specifically, and to continue with the foregoing example, the engineering drawing can be natively printed from Autodesk Revit to include the three-dimensional model, either alone or in conjunction with other components of the depicted application setting.

To carry forward a bit further with this example, at block 208 the physical three-dimensional object represented by the three-dimensional model can be constructed using, at least in part, the aforementioned hardcopy printout.

A more detailed example will now be provided. It will be understand that the details of this example are again intended to serve an illustrative purpose and are not intended to suggest any particular limitations with respect to the practice of these teachings.

Figure 3:
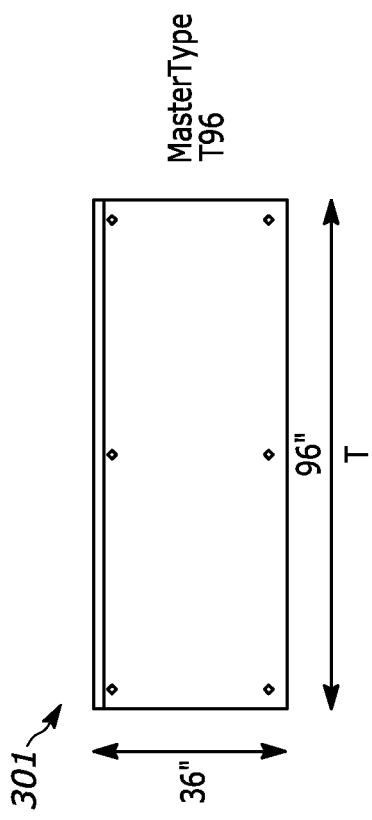
FIG. 3 comprises a process-step diagram as configured in accordance with various embodiments of these teachings.

Beginning at FIG. 3, this example begins with a parametric base model 301 (denoted as master type T96) that can be stretched (i.e., expanded or contracted) in both of the depicted dimensions. In this example, the variable "T" is the type of the three-dimensional object. Here, T refers to the master type and classifies this object as "stainless steel worktable with left under shelf and right cross bracing." The master type variable is combined here with a length variable to form the master type. Accordingly, "T96" specifies a stainless steel worktable with left under shelf and right cross bracing that is 96 inches in length.

Figure 4:
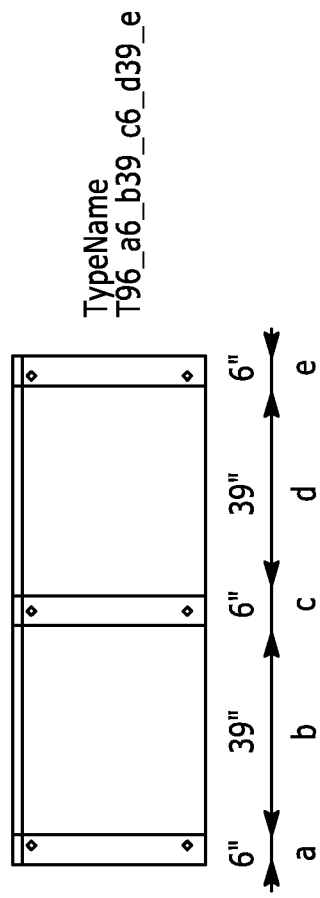
FIG. 4 comprises a process-step diagram as configured in accordance with various embodiments of these teachings.

Referring to FIG. 4, the parametric model is pre-split in modular parametric sections along a linear axis to allow for the removal and replacement of corresponding modular sections. In FIG. 4, each such section has a corresponding modular type variable. Beginning at the left, a first section is assigned to the "a" modular type variable, the next section is assigned to the "b" modular type variable, and so forth. Each modular type variable is combined with a length variable to form the corresponding modular type. Each modular section can then be combined using their modular types to form a type name. Accordingly, in this particular example, the complete type name would be T96_a6_b39_c6_d39_e6.

It may be noted that these teachings will accommodate reusing a particular modular type variable within a given type name to accommodate situations where the corresponding sections are themselves identical to one another. It may also be noted that each of the modular sections is parametric from left to right and are built in a way that allows them to be stretched as desired. So, for example, the b39 section could be stretched to 50 inches in width (which would then result in a change of the modular type to "b50"). This parametric attribute of the modular sections determines how each modular section is shaped and it also determines where the modular sections start and end.

Figure 5:
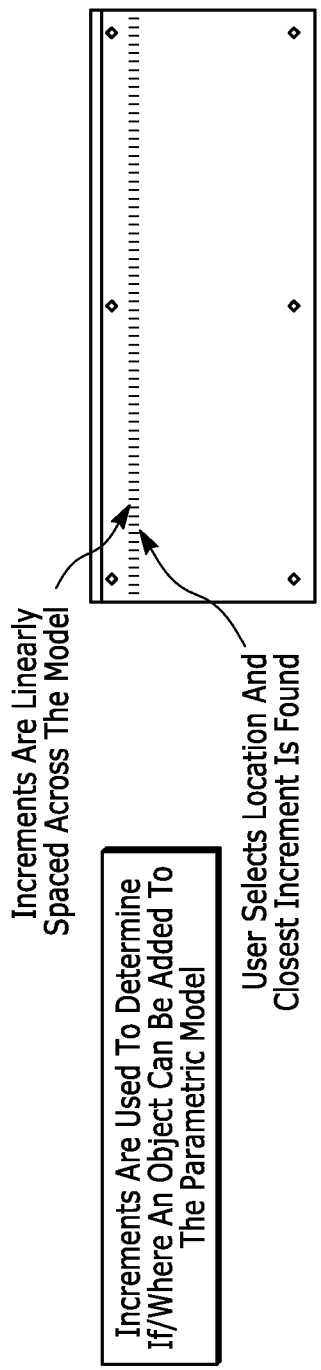
FIG. 5 comprises a process-step diagram as configured in accordance with various embodiments of these teachings.

With reference to FIG. 5, by one approach, the step/granularity of the parametric range can be infinite to permit each section to be extended (or contracted) to any particular extent or with respect to any particular desired granularity. Increments can be used to determine if and where an object can be added to the parametric model. For many practical application settings, it may be beneficial for some or all modular sections to adhere to at least some minimum constraints that must be met (for example, by requiring that each modular section be at least 6 inches in length).

Figure 6:
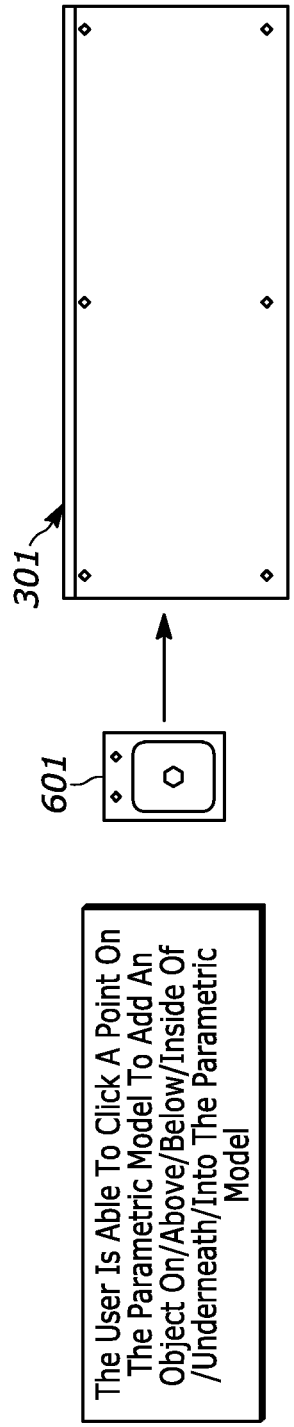
FIG. 6 comprises a process-step diagram as configured in accordance with various embodiments of these teachings.
Figure 7:
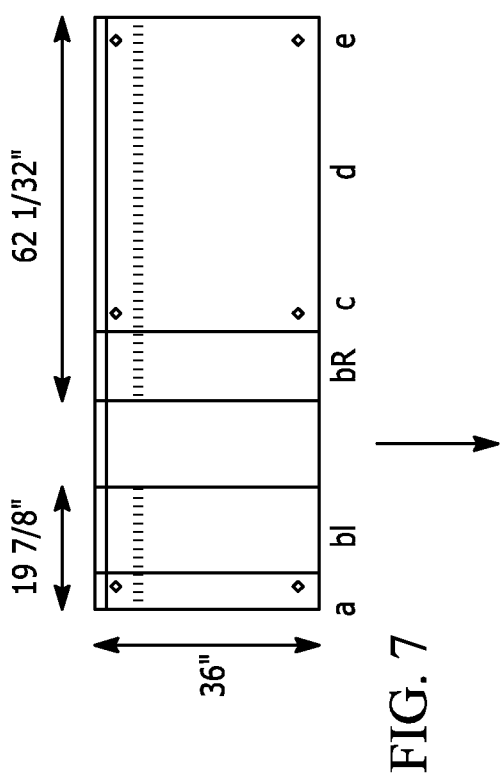
FIG. 7 comprises a process-step diagram as configured in accordance with various embodiments of these teachings.
Figure 8:
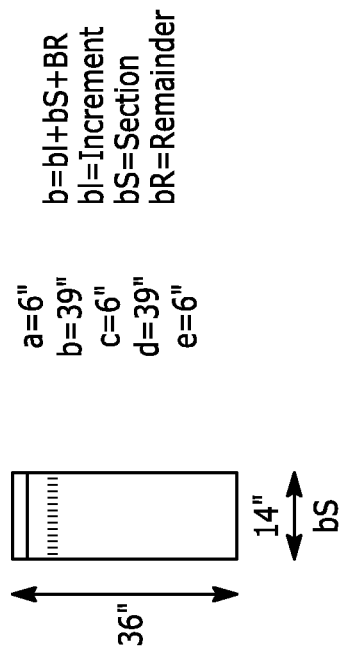
FIG. 8 comprises a process-step diagram as configured in accordance with various embodiments of these teachings.

With reference to FIG. 6, these teachings will accommodate permitting a user to click a point on the parametric model to add an object on, above, below, inside of, underneath, or within the parametric model. In this example, it is presumed that the user wishes to add a sink 601 to the table. Referring to FIGS. 7 and 8, an increment selected by the aforementioned user selection identifies the insertion point for receiving the object. In this case, the size of the object to be placed serves to inform and determine the size of the modular section required to be removed in order to provide adequate room for the object. In this example, previous section b (having a corresponding length of 39 inches) is split into three corresponding parts bI (referred to here as the increment), bS (referred to here as the section to be removed), and bR (referred to here as the remainder).

Referring to FIGS. 9, 10, and 11, the parametric model can be reconstructed using the modular parametric sections that have been parametrically shortened to allow for the new modular section containing the object to be placed within the model. The increments displaced by the object to be placed are removed from the parametric model to prevent additional objects from being placed on top of the object to be placed. A new modular section containing the object to be placed can be pulled from a database of modular sections containing various placeable objects. FIG. 9 presents the resultant dimensions that correspond to various parametric sections.

These figures, in addition to a new complete type name as described above, also presents a so-called simple name. Generally speaking, a type name can be simplified by removing the length parameters to leave only the modular type identifiers. These simple names can be used, for example, to find a matching parametric object in a pre-created database of parametric objects. It is possible to create modular sections of any size by locating the parametric object that matches the desired simple name and then adding the appropriate length parameters to each modular section to re-create the full type name for the created/modified three-dimensional model.

Figures 12, 13:
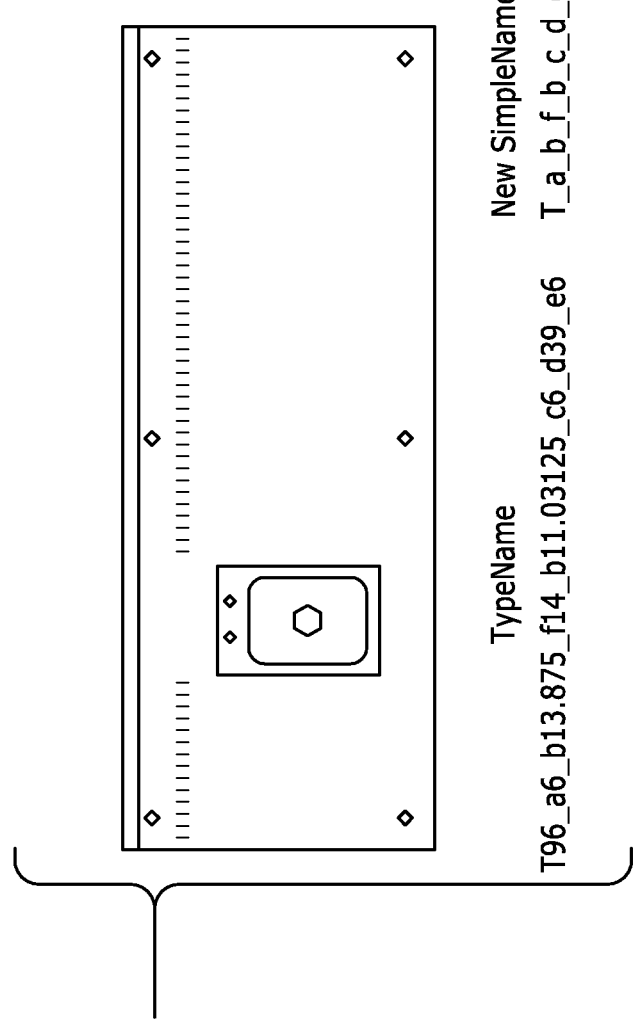
FIG. 12 comprises a process-step diagram as configured in accordance with various embodiments of these teachings.
FIG. 13 comprises a process-step diagram as configured in accordance with various embodiments of these teachings.

Referring now to FIGS. 12 and 13, the new modular section containing the object to be placed is located at the point selected by the user and all modular sections and parametric models are joined together to give the appearance of a single parametric model.

To recap, the aforementioned approach to modular identification, combined with the accommodation of user selections as described above with respect to FIG. 7, serves to create a new three-dimensional object from an existing three-dimensional object. In the example shown, the user added a new modular sink section to an existing modular table section using modular type b39. The modular section being customized was dissected into three parts described as the increment, the section, and the remainder. Here, the increment is the length from left to right from the left-most plane of the current modular section (i.e., b39) to the left-most plane of the new modular section to be added. The remainder is the length from left to right to the right-most side of the current modular section.

By one approach, when adding a new modular section into the middle of an existing modular section, these teachings will accommodate reducing the size of the existing modular section and duplicating it to create two smaller sections of the same modular section type. This approach leaves just enough length to accommodate the new modular section being added. In the example above, modular section type b39 is now replaced in the type name by three modular sections, i.e., b13.875_f14_b11.03125.

Figure 14:
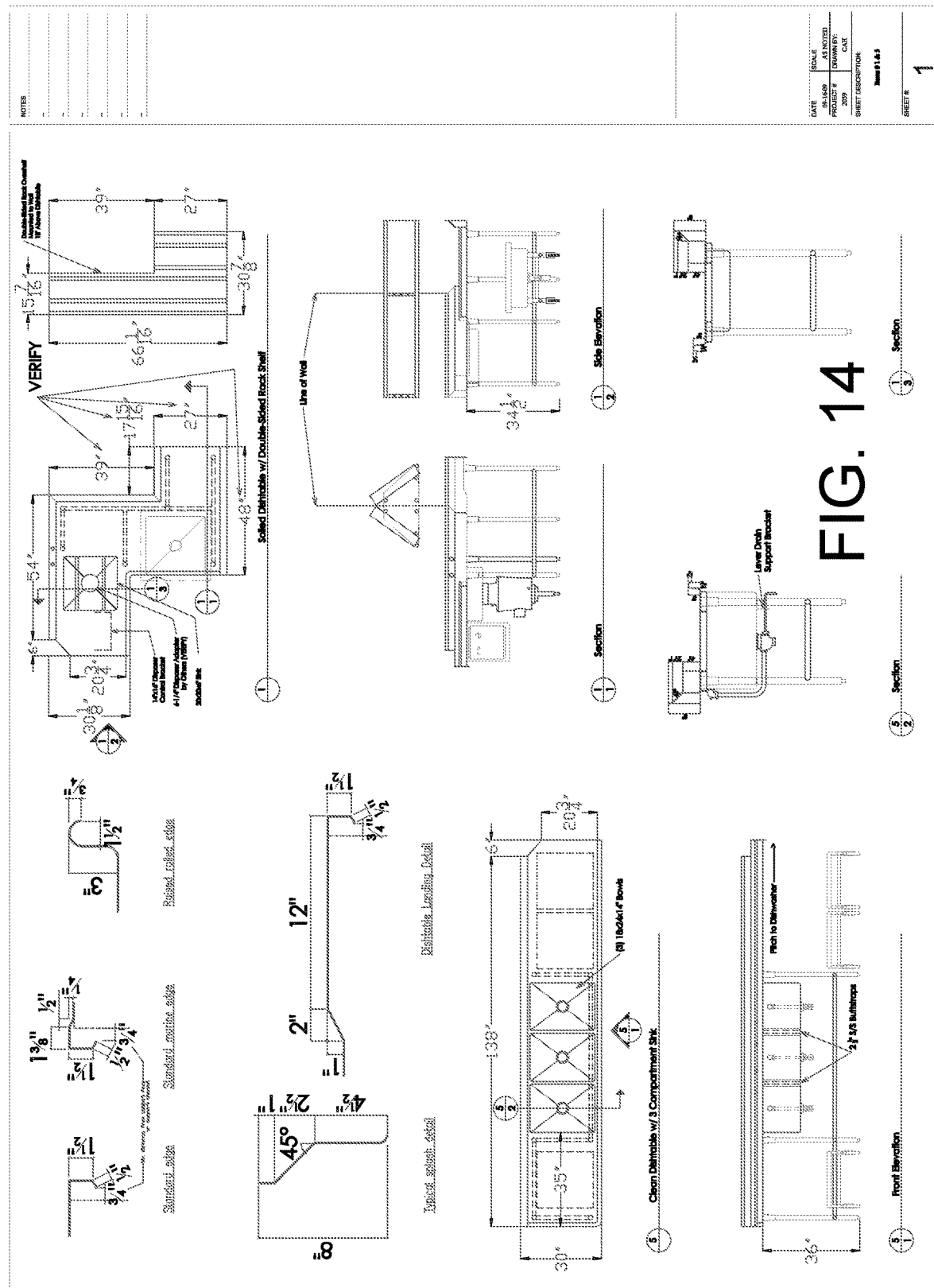
FIG. 14 comprises an engineering drawing as configured in accordance with various embodiments of these teachings.

As noted above, these teachings will accommodate printing hardcopy depictions. This includes printing so-called engineering drawings (sometimes referred to as fabrication shop drawings). More particularly, after the aforementioned modular sections are converted into a single parametric object, the single parametric object can serve to create such an engineering drawing. Engineering drawings are manufacturing schematics that are required and used in the fabrication of three-dimensional objects. Such drawings typically contain a list of parts, views of the object itself (including, for example, a top view of the object, a front view of the object, a side view of the object, and/or an isometric view of the object), a title block containing designer, project, and timestamp information, as well as notes and details that in the aggregate form a schematic that can be used by a skilled fabricator to build a one-off fabrication of the three-dimensional object. Such drawings contain exact dimensions to be used in the fabrication process and often denote materials, colors, finishes, and special instructions. FIG. 14 provides an illustrative example of an engineering drawing.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
   accessing a three-dimensional model configurator that develops a three-dimensional model for a component of a commercial kitchen by developing a mathematical coordinate-based representation of surfaces of an object in three dimensions by manipulating edges, vertices, and polygons in a simulated three-dimensional space, the three-dimensional model configurator having a first three-dimensional results capability and which outputs a developed three-dimensional model in a first file format:
   using the three-dimensional model configurator to develop and output a developed three-dimensional model in the first file format, the developed three-dimensional model having the first three-dimensional result;
   correlating components of the developed three-dimensional model in the first file format to corresponding codes that are expressions that correlate features of the developed three-dimensional model in the first file format to elements from a library of pre-created elements that are native to components expressed via a second file format, which second file format is used by a second three-dimensional model configurator that lacks the first three-dimensional results capability; and
   using the corresponding codes to select elements from the library of pre-created elements to output a three-dimensional model in the second file format, the three-dimensional model in the second file format having the first three-dimensional result;
   using the three-dimensional model in the second file format having the first three-dimensional result in the second three-dimensional model configurator notwithstanding that the second three-dimensional model configurator lacks the first three-dimensional results capability, such that the developed three-dimensional model in the first file format is fully usable inside the second three-dimensional model configurator as a function of the corresponding codes, notwithstanding a lack of information regarding a complete operating domain for the second three-dimensional model configurator.

2. The method of claim 1 wherein the first file format comprises an OBJ file format.

3. The method of claim 1 wherein the second file format comprises an RVT file format.

4. The method of claim 1 wherein the corresponding codes each comprise a string that identifies a particular predefined shape in the second file format and corresponding parameters for the particular predefined shape.

5. The method of claim 4 wherein at least one of the corresponding parameters is a variable value representing a physical dimension corresponding to the particular predetermined shape.

6. The method of claim 5 wherein at least a plurality of the corresponding parameters are variable values representing corresponding physical dimensions corresponding to the particular predetermined shape.

7. The method of claim 1 further comprising:
   via a user interface, providing to a user a three-dimensional model creation opportunity;
   receiving, via the three-dimensional model creation opportunity, user inputs that define the three-dimensional model; and
   storing the three-dimensional model in the memory in the first file format.

8. The method of claim 1 further comprising:
   printing a hardcopy printout of an engineering drawing as a function, at least in part, of the data for the three-dimensional model in the second file format.

9. The method of claim 8 further comprising:
   constructing a physical three-dimensional object using, at least in part, the hardcopy printout.

* * * * *